United States Patent
Periyalwar

(10) Patent No.: US 6,611,695 B1
(45) Date of Patent: Aug. 26, 2003

(54) METHOD AND APPARATUS FOR ASSIGNING FREQUENCY CHANNELS TO A BEAM IN A MULTI-BEAM CELLULAR COMMUNICATIONS SYSTEM

(75) Inventor: Shalini Suresh Periyalwar, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/466,689

(22) Filed: Dec. 20, 1999

(51) Int. Cl.[7] .............................. H04B 1/38; H04M 1/00
(52) U.S. Cl. .................. 455/562; 455/561; 455/450; 455/452; 455/453; 455/509; 455/512
(58) Field of Search .................................. 455/562, 561, 455/450, 452, 453, 436, 439, 509, 512; 370/331, 332, 252

(56) References Cited

U.S. PATENT DOCUMENTS

| | | | |
|---|---|---|---|
| 5,590,399 A | * 12/1996 | Matsumoto et al. | 455/449 |
| 5,615,409 A | * 3/1997 | Forssen et al. | 455/440 |
| 5,736,959 A | * 4/1998 | Patterson et al. | 342/354 |
| 5,890,067 A | * 3/1999 | Chang et al. | 455/446 |
| 5,903,842 A | * 5/1999 | Wang et al. | 455/450 |
| 5,903,843 A | * 5/1999 | Suzuki et al. | 455/452 |
| 5,920,819 A | * 7/1999 | Asanuma | 455/447 |
| 6,021,309 A | * 2/2000 | Sherman et al. | 455/12.1 |
| 6,112,092 A | * 8/2000 | Benveniste | 455/450 |
| 6,259,685 B1 | * 7/2001 | Rinne et al. | 370/330 |
| 6,347,234 B1 | * 2/2002 | Scherzer | 455/562 |

FOREIGN PATENT DOCUMENTS

| | | | | |
|---|---|---|---|---|
| EP | 0 876 074 A1 | 11/1998 | ............ | H04Q/7/36 |
| EP | 0 883 208 A2 | 12/1998 | .......... | H01Q/25/00 |

* cited by examiner

Primary Examiner—Edward F. Urban
Assistant Examiner—Marceau Milord

(57) ABSTRACT

Methods, apparatus, media and signals for assigning frequency channels to a beam in a Multi-beam cellular communications system [are disclosed. One method involves] generating a set of priority values for the multi-beam cellular communications system, each of the priority values representing selection priority for a corresponding frequency channel for a particular beam, and assigning a frequency channel to a given beam in response to the set of priority values.

30 Claims, 10 Drawing Sheets

| 101 | 102 | 104 | 106 | 108 | 110 | | | | |
|---|---|---|---|---|---|---|---|---|---|
| | CHANNEL IDENT. | CHANNEL FREQ. | CHANNEL IN USE? | BEAM 1 QUALITY | BEAM 1 PRIORITY | BEAM 2 QUALITY | BEAM 2 PRIORITY | BEAM 12 QUALITY | BEAM 12 PRIORITY |
| | 289 | 832.67 MHz | 0 (N) | 5 | 3 | 4 | 3 | 4 | 4 |
| | 290 | 832.7 MHz | 1 (Y) | 5 | 4 | 4 | 5 | 5 | 3 |
| | ... | ... | ... | ... | ... | ... | ... | ... | ... |

FIG. 3

EXEMPLARY CHANNEL REQUEST BY BEAM 1

$(\alpha=1, \beta=5, P_{CB}=\alpha Q + \beta \frac{D}{N})$

| | BEAM 1 | BEAM 2 | BEAM 3 | BEAM 4 | MAX PRIORITY DIFFERENCE FOR BEAM 1 |
|---|---|---|---|---|---|
| D = #CHANNELS IN USE IN BEAM | 6 | 2 | 9 | 12 | |
| N = #CHANNELS SUFF. CLEAR IN BEAM | 12 | 10 | 10 | 15 | |
| $\frac{D}{N}$ | 0.5 | 0.2 | 0.9 | 0.8 | |
| CH.1 QUALITY IN BEAM | 5 | 4 | 3 | 5 | |
| CH.2 QUALITY IN BEAM | 5 | 5 | 3 | 2 | |
| CH.3 QUALITY IN BEAM | 5 | 2 | 5 | 4 | |
| CH.1 PRIORITY IN BEAM | 5+2.5=7.5 | 4+1=5 | 3+4.5=7.5 | 5+4=9 | +1.5 |
| CH.2 PRIORITY IN BEAM | 5+2.5=7.5 | 5+1=6 | 3+4.5=7.5 | 2+4=6 | (0.0) |
| CH.3 PRIORITY IN BEAM | 5+2.5=7.5 | 2+1=3 | 5+4.5=9.5 | 4+4=8 | +2.0 |

FIG. 9

METHOD AND APPARATUS FOR ASSIGNING FREQUENCY CHANNELS TO A BEAM IN A MULTI-BEAM CELLULAR COMMUNICATIONS SYSTEM

FIELD OF THE INVENTION

The present invention relates to cellular communications, and more particularly to methods and apparatus for assigning frequency channels to a beam in a multi-beam cellular communications system, and for communicating with a source moving from a first region to a second region.

BACKGROUND OF THE INVENTION

In recent years, the popularity of wireless communication devices, such as cellular telephones for example, has increased exponentially, to the point where such devices are practically household items.

Providers of wireless telecommunication services typically divide a geographic region into a plurality of adjacent hexagonally-shaped "cells", each cell having a central base station for transmitting and receiving to and from any wireless communication devices which are presently located within the cell. Many older base stations include omnidirectional transceivers for transmitting and receiving in all directions within the cell. However, omnidirectional cell antennae typically have relatively low call capacities, and are overly susceptible to interference, as interference on a given frequency channel will prevent use of that channel anywhere within the cell, even if the interference is actually affecting only a relatively narrow angular region within the cell.

To address these difficulties, wireless telecommunication service providers have resorted to "sectoring", in which each cell is further divided into a number of "sectors", such as three 120° sectors for example. Three, directional antennae at the base station are used to transmit and receive signals only within the confines of a respective corresponding sector. In a sectored cell, interference on a particular frequency channel in one sector will not necessarily preclude use of that channel in another sector of the cell. The total number of frequency channels available for use within the cell is typically divided or allocated among the sectors, either on a fixed basis or preferably, dynamically.

More recently, as an extension of the above principles, service providers have implemented multi-beam cellular communications systems, in which each sector is further subdivided into a number of "beams", such as four 30° beams in each of the three sectors of the cell, for example. In this example, the base station would include twelve directional antennae, each antenna being configured to transmit and receive signals only within the physical confines of a particular corresponding one of the twelve beams into which the cell is divided.

It will be appreciated that the number of frequency channels available on any given cell is limited, due to the allocated spectrum for cellular communications and due to interference requirements which prevent a given cell from using the same set of frequencies as an adjacent cell. Thus, the base station has a limited number of frequencies which it must allocate or assign to the various beams within the cell. However, existing channel allocation methods do not appear to be suitable for multi-beam systems.

Fixed Channel Allocation (FCA) involves allocating a fixed number of frequency channels to each beam, such as eight channels per beam, for example. However, FCA fails to account for the dynamic nature of signal traffic or traffic demand within the cell. For example, at a given instant, only half of the available channels at the cell might be in use, but a particular user might not be able to place a call, simply because the user happened to be physically located within a beam in which all eight pre-allocated channels were in use, even though an adjacent beam might have none of its channels in use. Further, if the number of beams is increased, the number of fixed channels allocated per beam decreases, thus decreasing the trunking efficiency.

A number of dynamic channel allocation schemes exist. Some such schemes involve scanning available frequency channels for interference to determine channel quality, and assigning, to a sector for example, the channel having the highest channel quality within the sector. However, in multi-beam systems, because the beams are narrow and in close physical proximity to one another, channel quality is highly correlated among adjacent beams. In other words, the same frequency channels which are clear in one beam often tend to be equally clear in an adjacent beam, and the channels which are noisy in one beam are often equally noisy in the adjacent beam. Thus, in a multi-beam system, channel quality alone is not sufficient to resolve competing demands from adjacent beams for a new frequency channel.

In addition, as a user of a wireless telecommunications device such as a cellular telephone moves from one region to another adjacent region, such as moving from one beam to an adjacent beam within a cell for example, it is necessary for the wireless telecommunication service provider to perform an "inter-beam hand-off" or transfer the call to a new frequency channel in the adjacent region, and to signal the cellular telephone to re-tune to the new channel. Although such a hand-off ideally occurs sufficiently quickly that it is not noticeable to the user, occasionally a brief "mute" or signal interruption will occur, or the call may even be blocked or lost. This difficulty is aggravated in a multi-beam system, in which the regions (beams) are smaller, with the result that a larger number of hand-offs are required to track the user of the wireless communications device over a given range of movement. The increase in hand-offs may also result in increased signaling.

Thus, there is a need for a better way of assigning frequency channels to a beam in a multi-beam cell. In addition, there is a need for a better way of communicating with a source moving from a first region to a second region.

SUMMARY OF THE INVENTION

The present invention addresses the above needs by providing a method and apparatus for assigning frequency channels to a beam in a multi-beam cellular communications system. In one embodiment, the method involves generating priority values, each of the priority values representing selection priority for a corresponding frequency channel for a particular beam, and assigning a frequency channel to a given beam in response to the priority values.

The priority value may be calculated in a number of ways. For example, the priority value may be calculated as a function of both channel quality and traffic demand on the beam. If desired, the priority value may take into account not only the number of channels presently in use on a given beam, but also the number of channels which have a sufficiently clear channel quality to permit use within that beam.

In this manner, conflicting channel demands may be intelligently resolved, by balancing channel quality and traffic demands. Priority values may be dynamically calculated so as to assign a higher priority value to a particular channel for a given beam when traffic demand in that beam is high, effectively defining such a channel as a "preferred" channel for that beam. Conversely, the priority value may be reduced as traffic demand in the beam decreases, thereby making it more likely that the channel will be assigned to a different beam if needed.

An apparatus for carrying out the method includes a priority value generator operable to generate the priority values, and a frequency channel assignment device operable to assign the frequency channels to the given beam in response to the priority values.

In accordance with another aspect of the invention, there is provided a method and apparatus for communicating with a source moving from a first region to a second region. The method involves receiving an indication of channel quality representing a channel quality in the second region, of a frequency channel used in the first region to communicate with the source. The method further involves handing off the frequency channel to a transceiver in the second region to cause the transceiver in the second region to use the frequency channel to communicate with the source in the second region, in response to the indication representing at least a pre-determined minimum channel quality. An apparatus for carrying out the method includes a receiver operable to receive the indication of channel quality and a frequency channel assignment device operable to hand-off the frequency channel to the transceiver in the second region.

Specific embodiments of this latter aspect of the invention will allow a wireless telecommunication service provider to reduce the occurrence of "muting" and of blocking or loss of calls as a user of a wireless telecommunications device such as a cellular telephone moves from one region to another adjacent region. The service provider will be able to intelligently decide, on the basis of channel quality, whether it is feasible to simply transfer the call, on the same frequency channel, to the adjacent region, thereby eliminating the need for the cellular telephone to re-tune to a new frequency, which in turn reduces the likelihood of muting or blocking of the call. Conventional re-tuning will occur only if the channel quality of the current frequency channel would not be adequate in the adjacent region to permit the call to continue to be conducted on the same frequency.

Computer readable media, as well as computer data signals embodied in carrier waves including code segments, for directing a programmable device to perform the methods described herein are also provided.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 3 is a schematic representation of a priority table maintained by the control unit shown in FIG. 2.

FIG. 9 is a tabular representation of values calculated and/or employed by the channel assignment device of the control unit shown in FIG. 2, during an exemplary channel request from a first beam of the system shown in FIG. 1.

DETAILED DESCRIPTION

Figure 1:
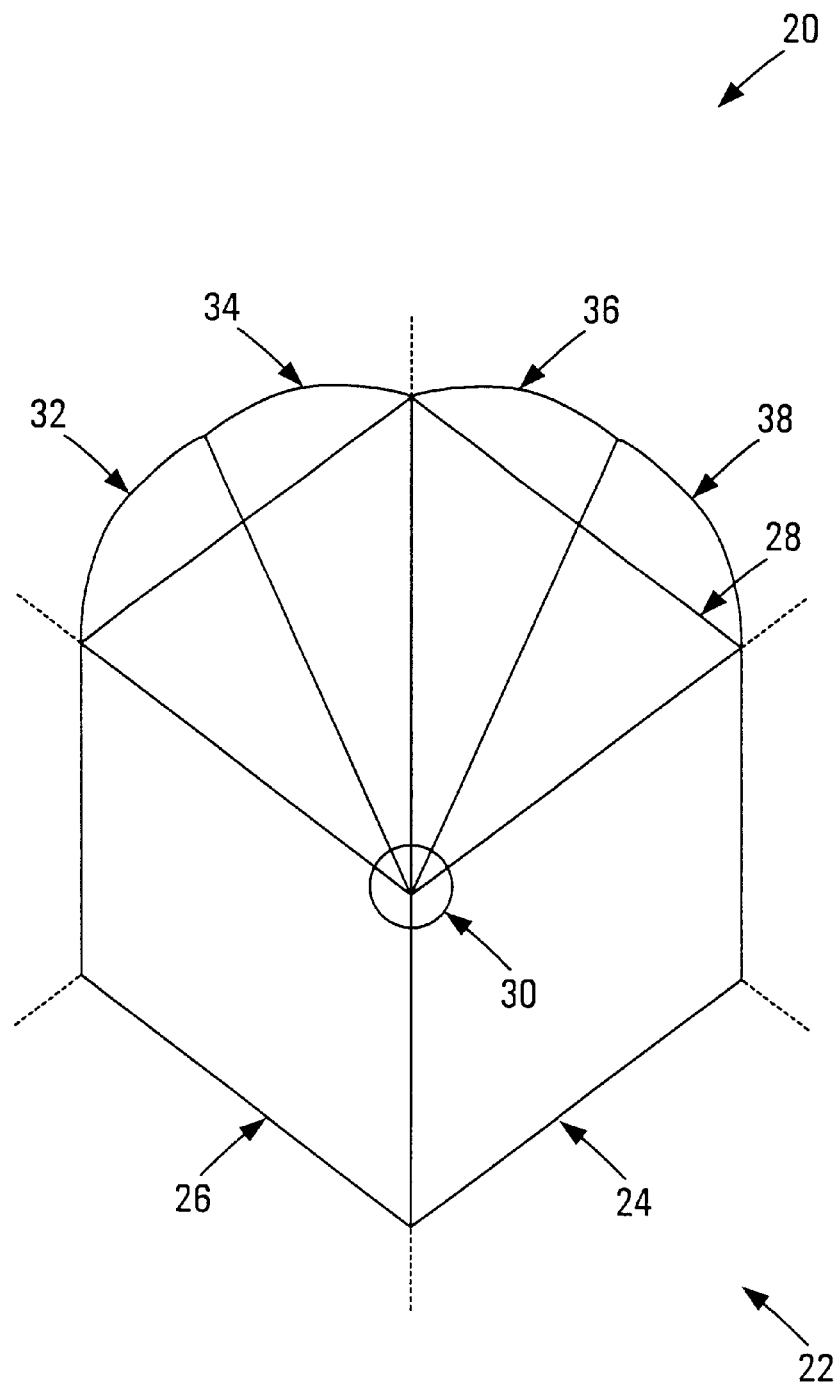
FIG. 1 is a fragmented schematic representation of a system for assigning frequency channels to a beam in a multi-beam cellular communication system, according to a first embodiment of the invention.

As shown in FIG. 1, a system for assigning frequency channels to a beam in a multi-beam cellular communications system is designated generally by the reference character 20. A geographic region in which wireless communication service is to be provided is divided into a plurality of adjacent hexagonally shaped cells, one of which is shown at 22. In this embodiment, each cell is approximately thirty square kilometers, although it will be appreciated that cells of alternative sizes may be employed.

Each cell is further subdivided into a plurality of sectors. In this embodiment, the cell 22 is subdivided into three 120° sectors 24, 26 and 28, although alternatively the cell may be divided into a different desired number of sectors.

A base station shown generally at 30 is located at the center of the cell 22. Generally, the base station serves as a central transmitter/receiver within the cell for effecting wireless communications with cellular communications subscribers who are presently physically located within the cell. The base station 30 is in communication with a Mobile Telephone Switching Office (MTSO), not shown, and is thereby ultimately in communication with the Public Switched Telephone Network (PSTN). Alternatively, or in addition, the base station may be in communication with a packet network such as an Internet Protocol (IP) network, for example. The base station 30 thus provides a wireless telecommunication link between all cellular communications subscribers located within the cell 22 and the PSTN and/or a packet network. In this embodiment, the base station 30 is a multi-beam base station. Each one of the sectors 24, 26 and 28 of the cell 22 is further subdivided into four adjacent 30° beams, such as those shown at 32, 34, 36 and 38. Thus, in this embodiment the cell 22 is subdivided into twelve such beams. Alternatively, each sector may be subdivided into a larger or smaller number of beams, as desired. Effectively, each beam is produced by a corresponding directional antenna pattern at the base station 30, the antenna pattern being configured to transmit and receive communication signals only within the angular confines of the beam. The radial extent of the beam may be controlled by adjusting the gain and transmission power of the corresponding directional antennae.

In this embodiment, the system 20 includes a Time Division Multiple Access (TDMA) system. More particularly, in this embodiment the system 20 employs 384 thirty-kHz channels and has a re-use of four, or in other words, the same set of frequency channels is re-used in every fourth cell. Accordingly, each cell has a "pool" of 96 thirty-kHz channels available to it, to be allocated among its twelve beams as required. Alternatively, it will be appreciated that a different re-use, or different numbers of frequency channels, may be substituted.

Effectively, as a wireless communications subscriber, such as a cellular telephone user for example, moves within the cell, a computer at the Mobile Telephone Switching Office (MTSO) monitors such movement. As the user moves from one beam to an adjacent beam within the cell, the MTSO signals the base station to transfer or "hand-off" the phone call to a new frequency or channel within the adjacent beam and to signal the cellular telephone to tune to the new channel. Ideally such a "hand-off" is performed sufficiently quickly that it is not noticeable to the user, however, in conventional systems there is often a brief "mute" or signal interruption during the hand-off, and in some cases the call will be blocked or lost. Similarly, as the user moves from one cell to an adjacent cell, the MTSO signals the base station to hand-off the call to the adjacent cell. Alternatively, such monitoring and signaling may be provided by other devices such as a Base Station Controller (BSC), for example. This type of movement monitoring and hand-off signaling is well known in the art and need not be further described herein.

Base Station

Figure 2:
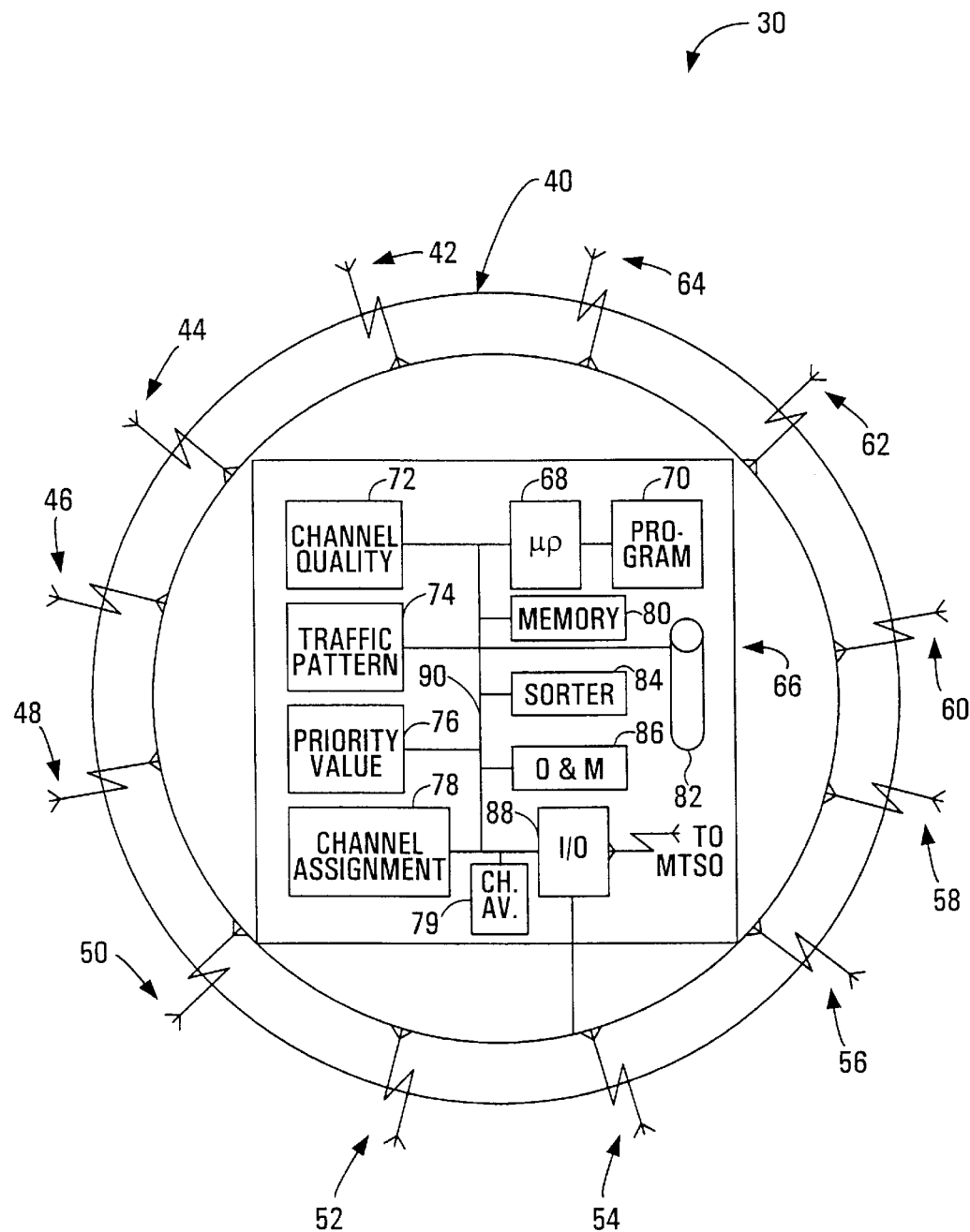
FIG. 2 is a schematic representation of a base station of the system shown in FIG. 1, including a block diagram of a control unit of the base station.

Referring to FIG. 2, the base station 30 is shown in greater detail. The base station 30 includes a transceiver chain shown generally at 40. In this embodiment, the transceiver chain 40 includes a floating transceiver chain, such as that described in European Patent Application EP0876074A1 assigned to Northern Telecom Limited, published Nov. 4, 1998. Alternatively, however, any transceiver structure which allows frequency channels to be allocated or deployed among the various beams as required may be substituted therefor. The transceiver chain 40 further includes twelve directional antennae 42 through 64, each antenna corresponding to a particular beam within the cell 22.

The base station 30 further includes a control unit shown generally at 66. In this embodiment, the control unit 66 includes a number of processing circuits including a processor 68, a program memory 70, a channel quality value generator 72, a traffic pattern value generator 74, a priority value generator 76, a frequency channel assignment device 78, a channel availability indicator 79, a memory 80, a storage device 82, a sorter 84, an Operation & Maintenance (O&M) unit 86 and an input/output (I/O) unit 88, all of which are in communication with each other via a bus 90. Alternatively, it will be appreciated that these circuits may communicate by other means such as a shared network or shared memory, for example.

The program memory 70 contains instruction codes for directing the processor 68 to control the transceiver chain 40 and more generally to control the base station 30 to perform various functions, including those described herein. For example, the instruction codes stored in the program memory include a channel quality routine, a traffic pattern routine, a priority routine, a channel assignment routine and a beam hand-off routine, all of which are described in greater detail below. In this embodiment the program memory 70 includes a FLASH memory. However, it will be appreciated that the FLASH memory is merely one example of a computer readable medium for providing such instruction codes, and that any other medium, such as an EEPROM, compact disc, floppy diskette or QIC tape, for example, may be substituted therefor. More generally, any alternative methods or structures for generating a computer data signal embodied in a carrier wave comprising code segments for directing a programmable device to perform equivalent functions to those described herein are not considered to depart from the scope of the present invention.

The channel quality value generator 72 produces a channel quality value for each frequency channel for each beam of the cell 22.

The traffic pattern value generator 74 generates a value representing channel traffic pattern for each beam at the base station 30.

The priority value generator 76 generates priority values, each of the priority values representing selection priority for a corresponding frequency channel for a particular beam.

The frequency channel assignment device 78 assigns a frequency channel to a given beam in response to the priority values.

The memory 80 is used for storing, among other things, a priority table and a traffic table as described in greater detail below. In this embodiment, the memory 80 includes a Random Access Memory (RAM). Alternatively, however, any other suitable volatile or non-volatile memory, such as an EEPROM or a hard disk drive for example, may be substituted therefor.

The storage device 82 is used for storing and accumulating historical information relating to the cell produced by the various other processing circuits such as the channel quality value generator 72, traffic pattern value generator 74, priority value generator 76 and O&M unit 86, for example. In this embodiment the storage device includes a hard disk drive. Alternatively, other storage devices such as an EEPROM for example, may be substituted therefor, or as a further alternative, such information may be stored remotely from the base station 30 and accessed or updated via the I/O unit 88, for example.

The sorter 84 is used for sorting a plurality of records stored in the memory 80 corresponding to respective frequency channels according to channel quality values for a given beam.

The O&M unit 86 serves to perform conventional operation and maintenance functionality. For example, the O&M unit constantly monitors the number of blocked or refused calls on each beam and stores such information in the storage device 82.

The I/O unit 88 allows the processor 68 and the other processing circuits to communicate with the Mobile Telephone Switching Office and to communicate with and control the transceiver chain 40 to effect wireless communications between cellular communications subscribers within the cell 22 and the PSTN or packet network.

In this embodiment, each of the channel quality value generator 72, traffic pattern value generator 74, priority value generator 76, frequency channel assignment device 78, channel availability indicator 79, sorter 84 and Operation & Maintenance (O&M) unit 86 is implemented by the processor 68, under the direction of corresponding instruction codes stored in the program memory 70. However, it will be appreciated that the specific physical implementation of the various processing circuits of the control unit 66 is not important. For example, each of these circuits 72, 74, 76, 78, 84 and 86 may include separate stand alone units if desired, housed within the base station 30 or alternatively located remotely from the base station and in communication therewith via the I/O unit 88, for example.

Priority Table

As shown in FIG. 3, a priority table according to the present embodiment of the invention is designated generally by the reference character 100. In this embodiment, the priority table 100 is stored in the memory 80 shown in FIG. 2.

The priority table 100 includes a separate channel record 101 for each of the 96 frequency channels available for use at the cell 22. Each record 101 includes a plurality of fields, including a channel identifier field 102 for storing an identification of the channel, a channel frequency field 104 for storing a number representing the frequency of the channel, and a channel-in-use field 106 for storing an indication of whether the channel is currently in use by any of the twelve beams of the cell 22. In this embodiment, the channel-in-use field 106 stores a bit which is set active when the corresponding channel is in use by one of the beams of the cell, and which is otherwise inactive. Alternatively, if desired, the channel-in-use field may further contain an identification of the beam on which the channel is in use.

Each channel record 101 further includes twelve channel quality fields shown generally at 108, such as a beam 1 channel quality field 109 for example. Each channel quality field corresponds to a particular one of the twelve beams in use at the cell, and stores a channel quality value representing the quality or clarity, or in other words, lack of interference, of that channel within the corresponding beam. Each such channel quality value is produced by the processor 68 under the direction of the channel quality routine, discussed in greater detail below.

In addition, each channel record 101 includes twelve priority fields shown generally at 110, such as a beam 1 priority field 111 for example. Each priority field corresponds to a particular one of the twelve beams, and stores a priority value representing the priority or importance of that channel to the corresponding beam. The priority values are produced by the processor 68 under the direction of the priority routine, discussed in greater detail below.

Traffic Table

Figure 4:
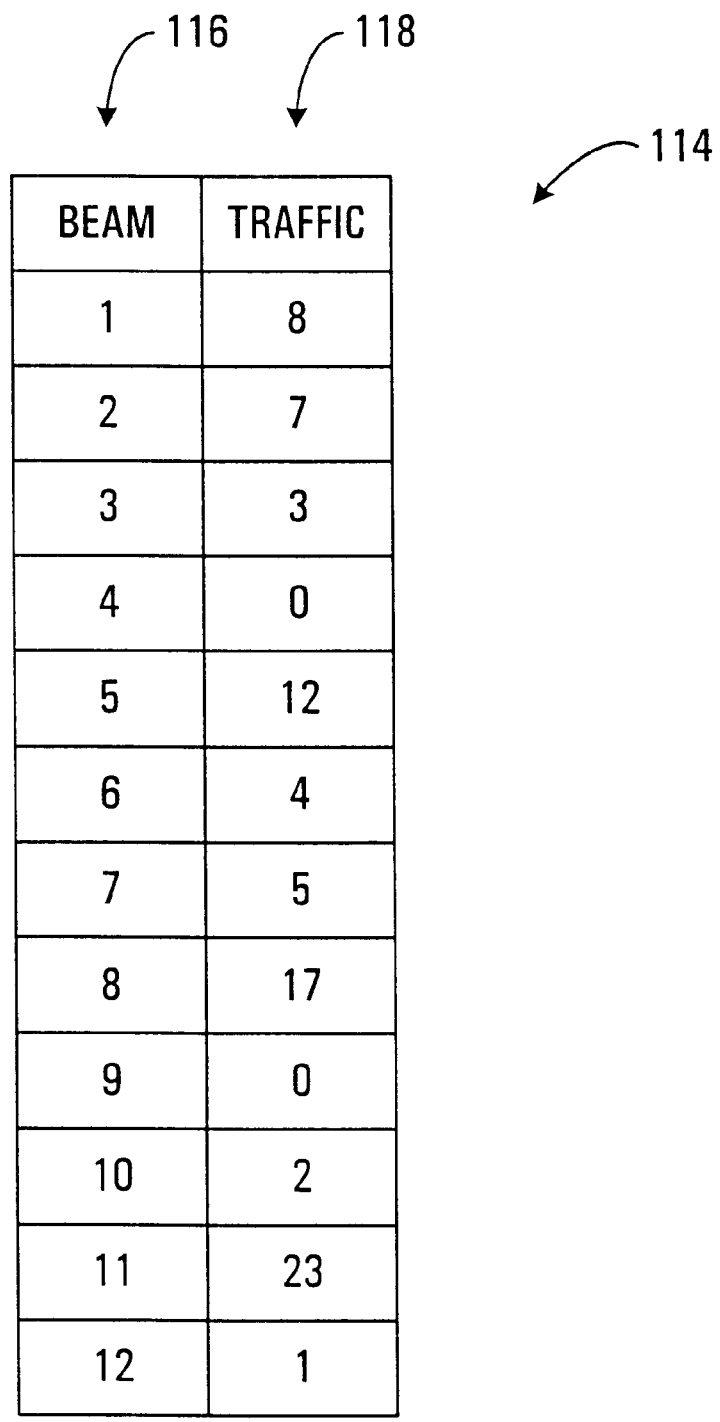
FIG. 4 is a schematic representation of a traffic table maintained by the control unit shown in FIG. 2.

As shown in FIG. 4, a traffic table according to the present embodiment of the invention is designated generally by the reference character 114. In this embodiment, the traffic table is stored in the memory 80 shown in FIG. 2. The traffic table includes a beam identifier field. 116 for storing an identification of the beam, and a traffic pattern field 118 for storing a traffic pattern value representing traffic pattern on the corresponding beam. The traffic pattern values are produced by the processor 68 under the direction of the traffic pattern routine, discussed in greater detail below.

Operation

Channel Quality Routine

Figure 5:
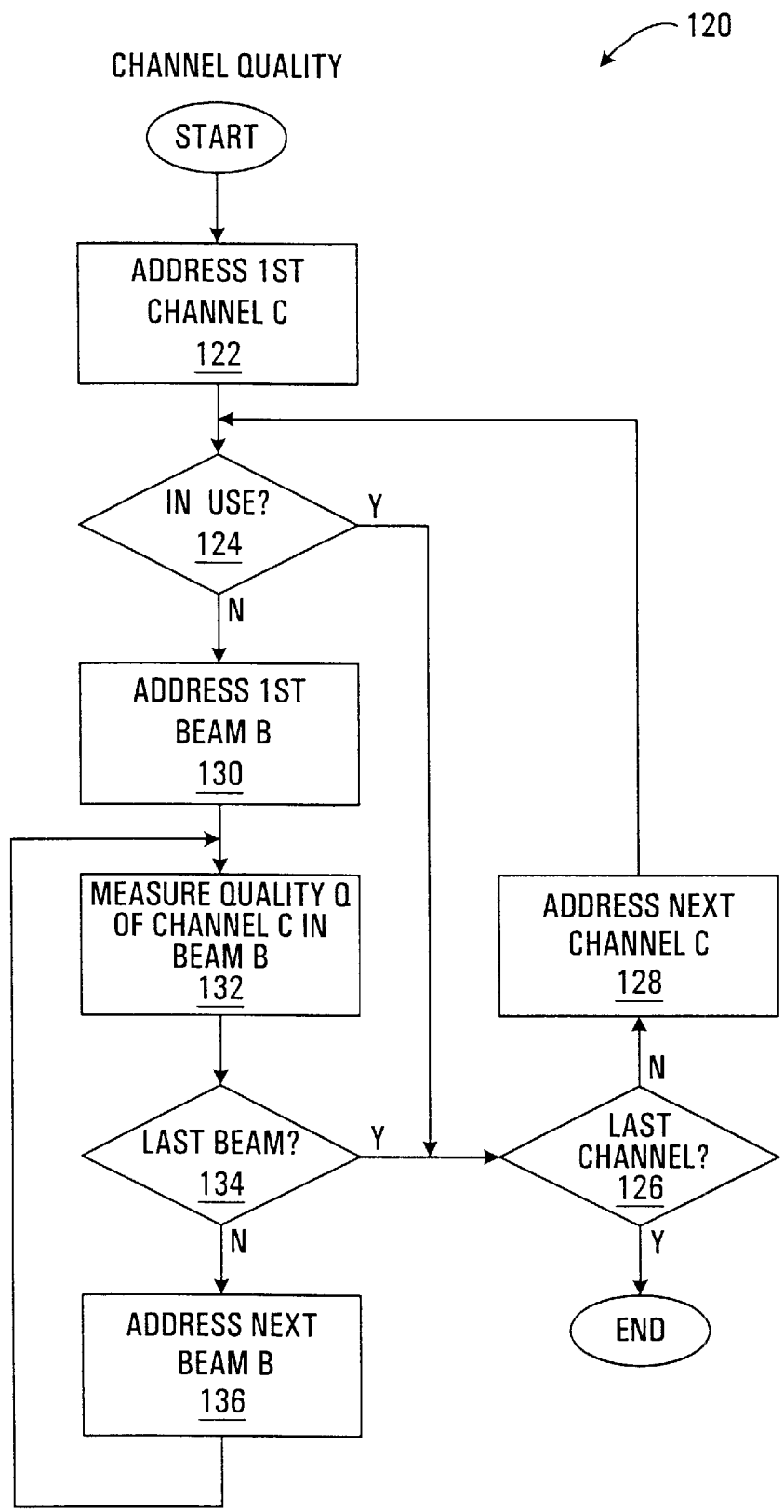
FIG. 5 is a flow chart of a channel quality routine executed by a channel quality value generator of the control unit shown in FIG. 2.

As shown in FIG. 5, the channel quality routine is designated generally by the reference character 120. In this embodiment, the channel quality routine includes instruction codes stored in the program memory 70 shown in FIG. 2. Generally, the channel quality routine directs the processor 68 to produce a channel quality value for each frequency channel, for each beam. More particularly, referring back to FIGS. 2 and 3, for each frequency channel available for use at the base station 30, the channel quality routine directs the processor 68 to produce a channel quality value for that channel on each of the twelve beams and to store these values in the twelve corresponding channel quality fields 108 of the corresponding channel record 101 of the priority table 100 shown in FIG. 3. The channel quality routine also directs the processor to store such values in the storage device 82 to effectively provide longer term channel quality data.

Preferably, the channel quality routine is frequently executed to produce a succession of channel quality values, or in other words to update the channel quality values in real time. In this embodiment, the channel quality routine is executed once per second. However, the routine may be executed more or less frequently depending on available processing power and performance requirements.

Channel quality may be measured in a number of different ways. In the present embodiment the I/O unit 88 shown in FIG. 2 acts as a receiver for receiving an indication of channel quality from a channel quality measurement device. For each of the twelve beams of the cell 22, the channel quality value generator 72 periodically causes each of the directional antennae 42 through 64 to tune to each of the 96 available frequency channels that is not currently in use by the base station 30. If the signal level received at the I/O unit from an antenna on a particular channel is low, indicating that there is very little noise on the channel, then that channel is identified as "clear" or high quality on the beam corresponding to the antenna. Conversely, a high signal level indicates significant noise and the channel is identified as noisy or low quality. Alternatively, however, other methods of measuring channel quality may be substituted. For example, the frequency of dropped or refused calls on the channel may provide an indication of channel quality. Or, channel quality may be determined by a weighted average of real-time and historical channel quality, for example. These and other alternative ways of measuring channel quality will be apparent to one of ordinary skill in the art upon reading this specification and are not considered to depart from the scope of the present invention.

It will also be appreciated that many conventional channel quality measurement techniques unfairly bias the measured channel quality within a beam, by failing to account for the fact that the channel may already be in use by a neighbouring beam within the cell. Disadvantageously, such conventional techniques would affect channel quality data by measuring and recording very low channel quality values for that channel, even though the channel is generally of very high quality within that beam, but is merely suffering from temporary interference caused by use of that channel within another beam in the cell 22. The present embodiment avoids such measurement bias by measuring channel quality of only those channels which are not currently in use by the cell 22, or more generally, by measuring channel quality of a frequency channel in one region only when the frequency channel is not in use in an adjacent region of the cell.

The channel quality routine 120 begins with a first block of codes shown at 122 in FIG. 5, which directs the processor 68 to address the first one of the 96 channels available for use within the cell 22.

Block 124 then directs the processor 68 to read the contents of the channel-in-use field 106 of the channel record 101 of the priority table 100 shown in FIG. 3 corresponding to the currently addressed channel, to determine whether the channel is in use by any of the twelve beams in the cell 22.

If the channel is in use at block 124, the processor 68 is effectively directed to omit measurement of channel quality of that channel. Block 126 directs the processor to determine whether it is currently addressing the last one of the 96 available channels and if so, the channel quality routine is ended. If not, block 128 directs the processor to address the next one of the 96 available channels, and the processor is directed back to block 124 to determine whether the currently addressed channel is in use.

If at block 124 the channel is not in use, block 130 directs the processor 68 to address the first one of the twelve beams in the cell 22.

Block 132 then directs the processor 68 to control the transceiver chain 40 to tune to the currently addressed channel in the currently addressed beam, and to produce an indication of channel quality by measuring the channel quality of that channel in that beam. In this embodiment, block 132 directs the processor to measure the signal level in decibels on the addressed channel in the addressed beam, representing pure noise in that channel. The processor is then directed to assign a numerical channel quality value, for example, a natural number between 1 and 5 in inverse proportion to the detected noise level. In the example used in this embodiment, detection of no noise would result in the highest channel quality value of 5, whereas detection of severe noise would result in the lowest channel quality value of 1. Alternatively, other channel quality measurement methods, scales and values may be employed if desired. Block 132 further directs the processor to store the numerical channel quality value in the priority table 100, in the channel quality field 108 corresponding to the currently addressed channel and beam, and to store the detected noise level in decibels in a corresponding channel quality log entry in the storage device 82.

Block 134 then directs the processor 68 to determine whether it has measured channel quality for the currently addressed channel on all twelve beams of the cell 22. If it has not, block 136 directs the processor to address the next beam and the processor is directed back to block 132 to measure the channel quality on the next beam.

If at block 134 the quality of the currently addressed channel has been measured on all twelve beams, the processor is directed at block 126 to determine whether all available channels have been addressed, and if so, to end the channel quality routine. If not, block 128 directs the processor to address the next available channel and the processor is directed back to block 124 to continue processing as described above.

Further simplifications and optimizations of the channel quality routine to speed up the measurements are possible and would be apparent to one of ordinary skill in the art upon reading this specification. For example, the frequency of measurements for channels which have a history of being clear in a given beam can be higher than for channels which have a history of being noisy in that beam.

Traffic Pattern Routine

Figure 6:
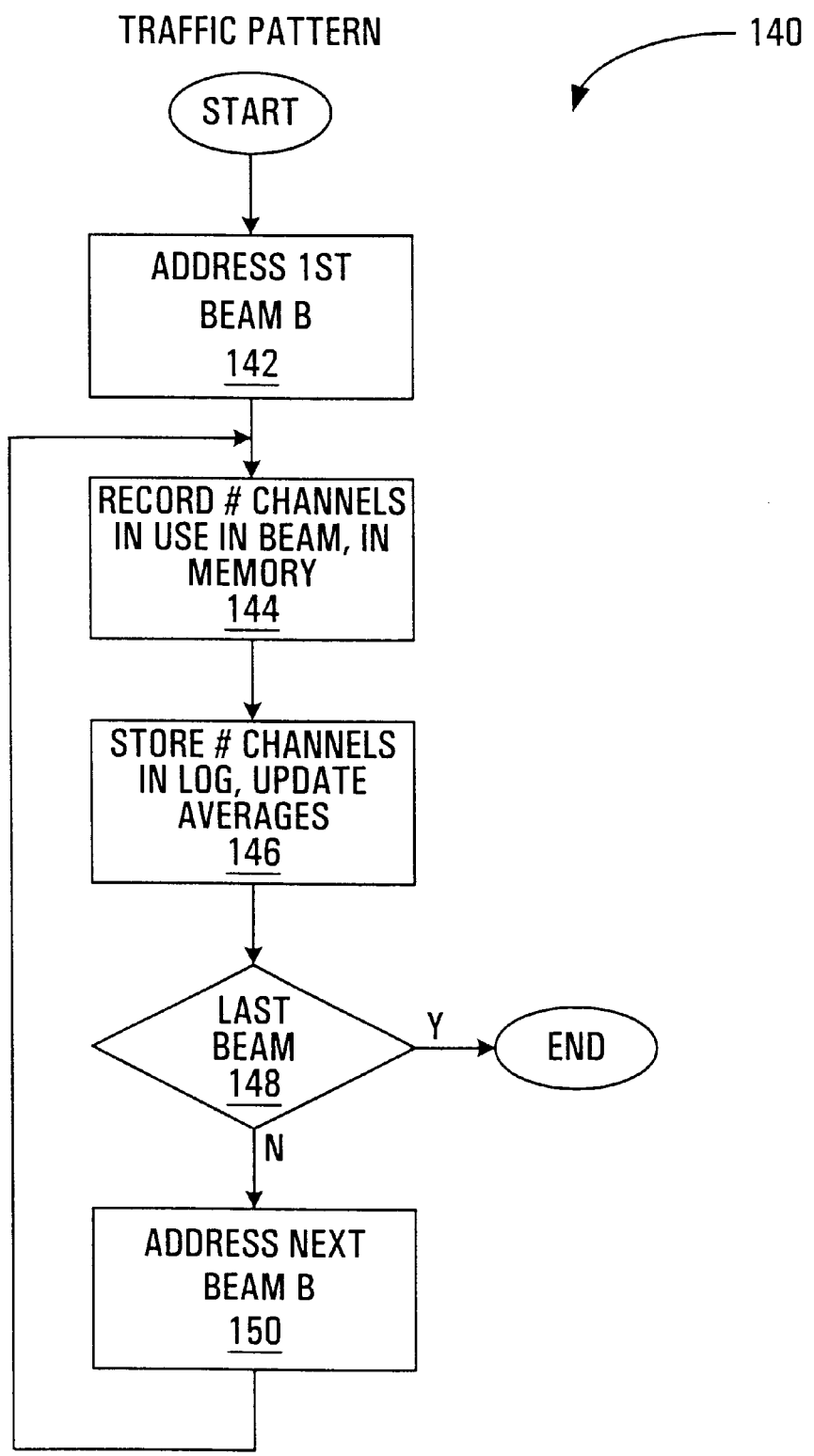
FIG. 6 is a flow chart of a traffic patter routine executed by a traffic patter value generator of the control unit shown in FIG. 2.

As shown in FIG. 6, the traffic pattern routine is designated generally by the reference character 140. Generally, the traffic pattern routine 140 directs the processor 68 to generate a value representing traffic pattern. More particularly, referring back to FIGS. 2 and 4, in this embodiment the traffic pattern routine directs the processor to address each of the twelve beams in the cell 22, to produce a measurement of traffic demand on each beam and to store these measurements or values in corresponding locations in the traffic table 114 in the memory 80 and in the storage device 82. In this embodiment, the traffic pattern routine includes instruction codes stored in the program memory 70.

Traffic demand may be measured in a number of ways. In the present embodiment, the processor 68 is directed to measure traffic demand by measuring frequency channel usage, which is achieved by determining the number of channels presently in use in the beam. The processor stores in the traffic table 114 a traffic pattern value representing real-time traffic in the beam, and also updates a historical average value. Alternatively, traffic demand may be measured by expressing demand as a ratio of the number of channels presently in use in the beam to the number of channels having sufficient channel quality to be usable in the beam. Or, as a further alternative, traffic demand may be measured by producing a measure of channel blocking experienced on the beam, by counting the number of blocked or refused calls within the beam over a time interval, for example. These and other alternative ways of measuring traffic demand will be apparent to one of ordinary skill in the art upon reading this specification and are not considered to depart from the scope of the present invention.

Preferably, the traffic pattern routine is frequently executed to provide real time measurements of traffic demand. In this embodiment, the channel quality routine is executed once per second. However, the routine may be executed more or less frequently depending on available processing power and performance requirements.

Referring to FIGS. 2, 4 and 6, the traffic pattern routine 140 begins with a first block of codes 142 shown in FIG. 6, which directs the processor 68 to address the first one of the twelve beams of the cell 22.

Block 144 then directs the processor 68 to determine the number of channels presently in use within the beam, and to store this number in a location of the traffic table memory 80 corresponding to the currently addressed beam. The number so stored represents a real-time traffic demand value.

Block 146 then directs the processor 68 to record the number of channels presently in use within the beam in a location of a log record (not shown) in the storage device 82 corresponding to the currently addressed beam and to the time at which the current number of channels in use was determined. Block 146 further directs the processor 68 to update the contents of entries in an average traffic demand record (not shown) in the storage device 82 representing the average traffic demand of the currently addressed beam at the time, day of week and date at which the number of channels in use in the beam was determined. Alternatively, if desired, the average traffic demand records may be updated from the log records on a daily or other less frequent basis, rather than performing such updates each time the traffic pattern routine is executed.

Block 148 then directs the processor 68 to determine whether traffic demand has been measured for all twelve beams, and if so, the traffic pattern routine is ended. If not, block 150 directs the processor to address the next beam and the processor is directed back to block 144 to determine the number of channels in use in the next beam.

Priority Routine

Figure 7:
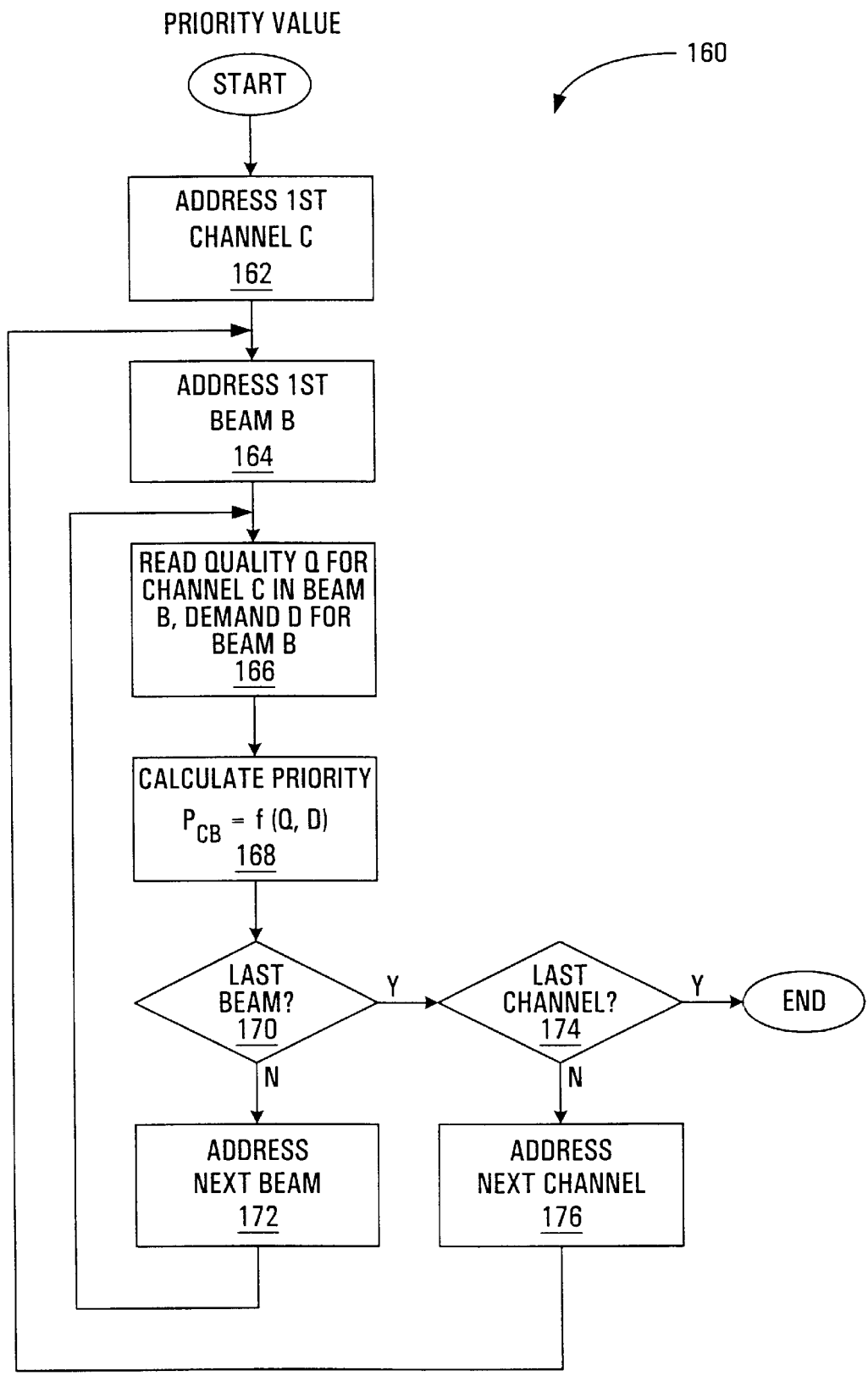
FIG. 7 is a flow chart of a priority routine executed by a priority value generator of the control unit shown in FIG. 2.

As shown in FIG. 7, the priority routine is designated generally by the reference character 160. Generally, referring back to FIG. 2, the priority routine directs the processor 68 to generate priority values, each of the priority values representing selection priority for a corresponding frequency channel for a particular beam. In this embodiment, the priority routine includes instruction codes stored in the program memory 70.

It will be appreciated that some conventional adaptive channel allocation algorithms allocate channels on the basis of channel quality. However, such conventional algorithms are not well-suited to multi-beam cellular communication systems, in which the beams are narrow and close together, with the result that channel quality is often identical or at least highly correlated between adjacent beams. Thus, channel quality alone is not sufficient to resolve conflicting channel demands from two adjacent beams in a multi-beam system.

Accordingly, in the present embodiment of the invention, a priority value is generated to address this problem. In this embodiment, the priority value is generated in response to channel quality and traffic pattern. More particularly, priority values are calculated as a function of both channel quality values for particular channels on the particular beam, and of the traffic pattern values, or traffic demand, for that beam.

Referring to FIGS. 2, 3, 4 and 7, the priority routine 160 begins with a first block of codes 162 shown in FIG. 7, which directs the processor 68 to address the first one of the 96 frequency channels available in the cell 22.

Block 164 then directs the processor 68 to address the first one of the twelve beams of the cell 22.

Block 166 directs the processor 68 to read the contents of the channel quality field 108 of the channel record 101 of the priority table 100 shown in FIG. 3, corresponding to the currently addressed channel and the currently addressed beam, representing the quality Q of that channel in that beam. Block 166 further directs the processor to read the traffic pattern value D corresponding to the currently addressed beam, stored in the traffic table 114 shown in FIG. 4, representing the number of channels presently in use in that beam.

At block 168, the processor 68 is directed to generate a priority value representing selection priority for the currently addressed frequency channel for the currently addressed beam. Generally, the priority value P is produced as a function of the channel quality Q and the traffic demand D. In this embodiment, block 168 directs the processor to first read the contents of the entire column of channel quality fields 108 corresponding to the currently addressed beam in the priority table 100 shown in FIG. 3, and to determine a number N of frequency channels having a channel quality value Q greater than or equal to a minimum acceptable channel quality threshold value. In this embodiment, where quality is represented by a natural number $1 \leq Q \leq 5$, the processor is directed to count the number N of channels having a quality $Q \geq 4$ for the currently addressed beam, representing the number of channels available on the current beam having minor or acceptable interference. Alternatively, other quality scales and minimum thresholds may be chosen. Block 168 then directs the processor to calculate a "relative loading" value D/N for the beam, and to calculate a priority value P according to the following equation:

$$P_{CB} = \alpha Q + \beta \frac{D}{N}$$

where $P_{CB}$ is the priority value for channel C for beam B;
Q is the channel quality value for channel C in beam B;
D is the traffic pattern value for beam B;
N is the number of channels having at least a minimum acceptable channel quality value Q in beam B; and
$\alpha$ and $\beta$ are empirically obtained weighting factors.

Alternatively, it will be appreciated that other methods or functional relationships may be used to calculate the priority value, depending on the particular requirements and preferences of the cell and of the network administrator. For example, the number N may be calculated to exclude channels that are presently in use on other beams in the cell 22. Alternatively, the priority value may be calculated as a function of the historical traffic demand for that beam at the present time of day, week or month, as indicated by data stored in the log record in the storage device 82. Or, priority may be functionally dependent on a weighted sum of the real time traffic demand value and the historical traffic demand. These and other alternative ways of generating priority values will be apparent to one of ordinary skill in the art upon reading this specification and are not considered to depart from the scope of the present invention.

Block 168 further directs the processor 68 to store the priority value so generated in the priority table 100, in the priority field 110 corresponding to the currently addressed beam of the channel record 101 corresponding to the currently addressed channel.

Block 170 then directs the processor 68 to determine whether a priority value has been generated for the currently addressed channel for each of the twelve beams of the cell 22. If not, block 172 directs the processor to address the next beam and the processor is directed back to block 166.

If at block 170 all twelve priority values have been calculated for the currently addressed channel, block 174 directs the processor 68 to determine whether such priority values have been calculated for all 96 channels available in the cell 22, and if so, the priority routine is ended. If not, block 176 directs the processor 68 to address the next channel, and the processor is directed back to block 164 to continue processing as described above.

It will be appreciated that the priority routine described above represents a general routine, in which priority values are regularly calculated and stored for each frequency channel, for each beam. However, if desired, the priority routine may be modified to produce priority values only as needed. For example, the priority routine might be invoked by the channel assignment routine below, only when a particular plurality of channels have the same high channel quality for the requesting beam, and may be invoked in this manner to generate priority values only for this particular plurality of channels. Such a variation may conserve processing power.

Channel Assignment Routine

Figure 8:
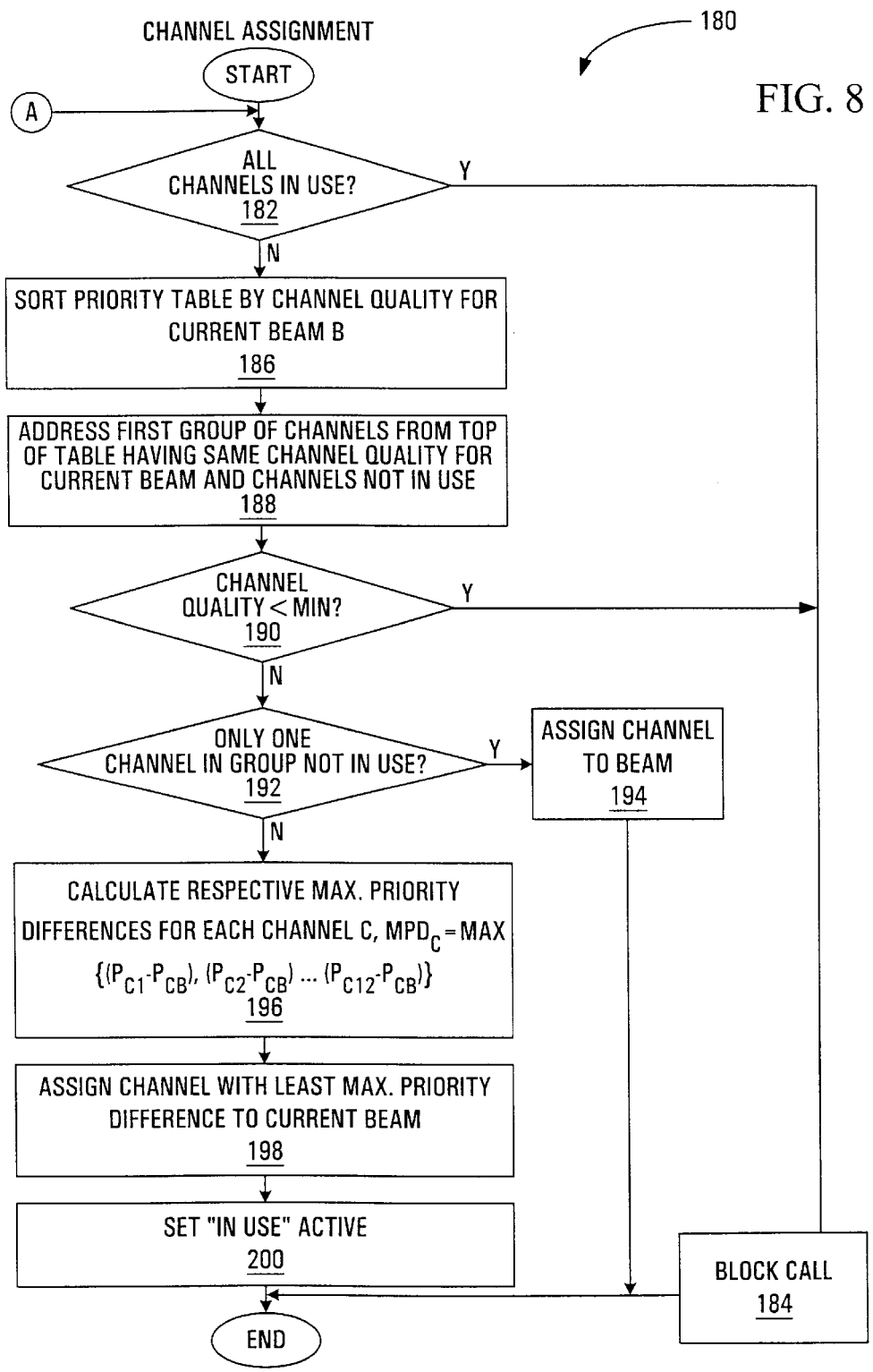
FIG. 8 is a flow chart of a channel assignment routine executed by a frequency channel assignment device of the control unit shown in FIG. 2.

As shown in FIG. 8, the channel assignment routine is designated generally by the reference character 180. Referring back to FIG. 2, in this embodiment the channel assignment routine includes instruction codes stored in the program memory 70. Generally, the channel assignment routine directs the processor 68 to assign a frequency channel to a given beam in response to the priority values stored in the priority table 100. As discussed above in connection with the priority routine 160, in a multi-beam system having narrow, closely adjacent beams, channel quality alone is not a sufficient indicator to resolve conflicting demands from adjacent beams, which often have identical or highly correlated channel quality values due to their close physical proximity.

Accordingly, the present embodiment of the invention addresses this difficulty by allocating channels on the basis of the priority values calculated by the processor under the direction of the priority routine described above. Effectively, the channel assignment routine directs the processor to assign to a given beam a frequency channel having the highest channel quality value for the given beam, and where two or more frequency channels have approximately the same channel quality value for the given beam, the processor is directed to assign to the given beam a frequency channel having a lowest relative priority value of the channels among a group of beams. More particularly, in this embodiment the relative priority value is a maximum priority difference value for each channel in the requesting beam, as explained in further detail below. However, one of ordinary skill in the art presented with this specification will readily conceive of alternative ways to compute and compare relative priority values, and such departures are not considered to depart from the scope of the invention.

In effect, the channel assignment routine serves to intelligently reconcile conflicting channel demands from the beams, by providing optimum assignments of channels within the cell. As a hypothetical illustration, suppose beam 1 requests a channel, and suppose that there are three unused channels X, Y and Z which have the same high channel quality of 5 for beam 1. Beam 1 is indifferent as to which of these channels is assigned to it, as each channel has the same quality in beam 1. However, it is quite possible that channel Y, for example, is the last unused channel which is sufficiently clear to be used in beam 3. It is therefore desirable to refrain from assigning channel Y to beam 1, in order to leave at least one usable channel available for beam 3 if required. Channel quality alone is not sufficient to decide which channel to assign to beam 1, as each of the channels X, Y and Z might have a high channel quality of 5 on at least one other beam in the cell. The present embodiment of the invention addresses this difficulty, by the following use of priority values.

The channel assignment routine 180 is initiated upon receiving a communication signal from a mobile station (MS), such as a telephone call from a cellular telephone, on a particular beam within the cell 22. Upon receiving such a communication signal, it is necessary for the base station 30 to assign a frequency channel to the mobile station to enable communication between the mobile station and the base station.

Referring to FIGS. 2, 3 and 8, the channel assignment routine 180 begins with a first block of codes 182 which directs the processor 68 to read the contents of the channel-in-use fields 106 of all of the channel records 101 in the priority table 100, to determine whether all channels of the cell 22 are presently in use. If they are, block 184 directs the processor to block or drop the call, and the channel assignment routine is ended.

If not all channels are in use, block 186 directs the processor 68 to sort the priority table 100 shown in FIG. 3 according to the contents of the channel quality field 108 corresponding to the particular beam in which the communication signal from the mobile station was received, in descending order. For example, if a communication signal was received on beam 1 from a cellular telephone, block 186 would direct the processor 68 to sort the channel records 101 according to the contents of the beam 1 channel quality field 109 in descending order, such that the channel records 101 having the highest channel quality value for beam 1 appear at the top of the priority table 100 and the channel records having the lowest channel quality value for beam 1 appear at the bottom of the table.

Block 188 then directs the processor 68 to examine the channel records 101 in the priority table 100, from the top down, and to identify a first group of channel records corresponding to channels which have the same channel quality value for the current beam and which are not presently in use in the cell. The "group" includes one or more channel records. In the present example, where a call is received on beam 1, block 188 directs the processor to read the contents of the beam 1 channel quality fields 109 and the channel-in-use fields 106 to perform such identification. For example, if there are four channels having the highest channel quality value of 5 for beam 1 and three of the four channels are not in use, then block 188 would direct the processor to address this unused group of three channels. Alternatively, if all four of the channels having a beam 1 channel quality value of 5 is in use, block 188 would then direct the processor to examine the next successive group of channel records in the table corresponding to a group of channels having a channel quality of 4 for beam 1 and which have inactive channel-in-use field contents, and so on.

Upon identifying a group of equal quality unused channels at block 188, block 190 directs the processor 68 to read the contents of the channel quality field 108 corresponding to the beam upon which the communication from the mobile station was received, of a first one of the currently addressed channel records 101. Block 190 further directs the processor to determine whether this channel quality value is less than a minimum channel quality threshold value representing a minimum channel quality required for conducting a call on the channel. In the present example, where a communication signal is received on beam 1 from a cellular telephone, block 190 directs the processor to read the contents of the beam 1 channel quality field 109 of the currently addressed channel record 101 to determine whether the channel quality value stored therein is less than four, for example. If this channel quality value is less than the minimum threshold value, then because the channel records 101 are sorted in order of descending channel quality values for the relevant beam, there are therefore no available channels having an adequate channel quality value for conducting the call. Accordingly, block 184 directs the processor to block or drop the call and the channel assignment routine is ended.

If the channel quality of the addressed group of channels is at least as great as the minimum threshold quality value, then block 192 directs the processor 68 to determine whether there is only one channel in the currently addressed group of unused channels. If so, block 194 directs the processor 68 to assign such an unused channel to the current beam (in this example, beam 1), and the channel assignment routine is ended. Effectively, therefore, block 194 assigns to the given beam a frequency channel associated with a record preceding remaining records in a descending sort.

If, however, the group of channel records having equal channel quality values for the current beam includes at least two unused channels, then block 196 directs the processor 68 to effectively identify which of the unused channels is the least important to the other eleven beams within the cell. It will be appreciated that the requesting beam is indifferent as to which of the addressed group of channels is assigned to it, as each of the addressed group of channels has an identical channel quality value in the requesting beam. Therefore, block 196 directs the processor to determine, based on priority values, which of the addressed channels is the least important to beams other than the requesting beam, so that this channel may be assigned to the requesting beam. In this embodiment, this is achieved by directing the processor to calculate a relative priority value for each channel in the current beam relative to other beams, and to identify the frequency channel having the lowest relative priority value. More particularly, in this embodiment each relative priority value is calculated as a maximum priority difference for each of the addressed channels. For each of the addressed channels, block 196 directs the processor to calculate eleven difference values, one for each of the other beams in the cell, and to identify the maximum priority difference. In other words, where beam 1 is the requesting beam, for example, the processor is directed to calculate, for each channel C in the currently addressed group of unused channels having equal channel quality in beam 1:

$$MPD_C = \max\{(P_{C2}-P_{C1}),(P_{C3}-P_{C1}),\ldots(P_{C12}-P_{C1})\}$$

where:

$MPD_C$=maximum priority difference value for channel C; and $P_{CX}$=priority value for channel C in beam X.

Such priority difference values and maximum priority difference values are temporarily stored in the memory 80 shown in FIG. 2. After calculating such maximum priority value differences for each of the currently addressed group of channels, block 196 further directs the processor 68 to identify the channel having the lowest relative priority by identifying the channel record having the least such maximum priority difference value $MPD_C$. It will be appreciated that the priority difference values may be either negative or positive, and therefore, the following clarification of the meanings of "maximum" and "least maximum" is provided. The term "maximum" in relation to the maximum priority difference values $MPD_C$ means the priority difference value which is closest to positive infinity. For example, if a particular channel having a priority value in the requesting beam of 7 has priority values of ranging from 3 to 9 in other beams, then the priority difference values will range from −4 to +2 for that channel, and the "maximum" priority difference value $MPD_C$ will be +2. Similarly, "least" in relation to the "least maximum priority difference value" means the $MPD_C$ value which is closest to negative infinity among the group of $MPD_C$ values. For example, if three addressed unused channels have respective $MPD_C$ values of 2, −4 and −1, then −4 is the "least" $MPD_C$ value.

Block 198 then directs the processor 68 to assign that channel having the lowest relative priority value (i.e. least $MPD_C$ value) among the currently addressed group, to the current or requesting beam.

Finally, block 200 directs the processor to set the contents of the channel-in-use field 106 of the currently addressed channel record to active to indicate that the channel is temporarily unavailable and that channel quality should not be measured for the channel. The channel assignment routine is then ended.

Although the channel assignment routine described above uses priority values to select a channel from among a group of channels having the "same" quality for the requesting beam, it will be appreciated that the above routine may be modified to instead identify at block 188 a group of channels merely having approximately but not necessarily precisely equal channel quality values, and to apply the priority condition to select from among this larger group of channels.

Exemplary Channel Request

The operation of the channel assignment routine may be better understood by means of a simple numerical example.

As shown in FIG. 9, an exemplary table of values is designated generally by the reference character 204. In the example shown, for simplicity, it is assumed that there are only four relevant beams in the cell. It is further assumed that a call has been initiated on beam 1, or in other words, that beam 1 is the beam which is requesting a channel. For illustrative purposes, it is assumed that the values of the empirically obtained weighting factors used in the calculation of priority values are $\alpha=1$ and $\beta=5$ respectively.

Referring to FIGS. 8 and 9, after sorting the priority table 100 by the contents of the beam 1 channel quality field at block 186, it is assumed that at block 188 the processor 68 has identified three unused channels having an equal channel quality value of 5 for beam 1. These three unused channels are arbitrarily labelled as channels 1, 2 and 3 respectively in FIG. 9.

For beam 1, it is assumed that there are presently 6 channels in use in beam 1, and that there are a total of 12 channels which are generally sufficiently clear to be used in beam 1, so that $D/N=6/12=0.5$. As noted, the channel qualities for channels 1, 2 and 3 in beam 1 are all equal to 5.

For beam 2, it is assumed that there are presently 2 channels in use in beam 2, and that there are a total of 10 channels which are generally sufficiently clear to be used in beam 2, so that $D/N=2/10=0.2$. It is assumed that channels 1, 2 and 3 have beam 2 channel quality values of 4, 5 and 2 respectively.

For beam 3, it is assumed that there are presently 9 channels in use in beam 3, and that there are a total of 10 channels which are generally sufficiently clear to be used in beam 3, so that $D/N=9/10=0.9$. It is assumed that channels 1, 2 and 3 have beam 3 channel quality values of 3, 3 and 5 respectively.

For beam 4, it is assumed that there are presently 12 channels in use in beam 4, and that there are a total of 15 channels which are generally sufficiently clear to be used in beam 4, so that $D/N=12/15=0.8$. It is assumed that channels 1, 2 and 3 have beam 4 channel quality values of 5, 2 and 4 respectively.

It will be appreciated that channel quality alone is not sufficient to decide which of the three unused channels to assign to beam 1. The three channels each have beam 1 channel quality of 5, but channel 1 also has a beam 4 channel quality of 5, channel 2 also has a beam 2 channel quality of 5, and channel 3 also has a beam 3 channel quality of 5. Thus, each of the channels 1–3 has an equally high channel quality in at least one beam other than the requesting beam.

As far as beam 1 is concerned, the choice of channels does not matter, as each of channels 1, 2 and 3 will perform with equal quality in beam 1. From the point of view of beam 3, however, there is only one unused channel, channel 3, which is sufficiently clear to be used in beam 3. If channel 3 is assigned to beam 1, therefore, there will be no channels available for use in beam 3. The present embodiment of the invention thus avoids this difficulty by the use of priority values as described in connection with FIG. 8.

In this example, as discussed in the context of the priority value routine shown in FIG. 7, where $\alpha=1$ and $\beta=5$, the processor 68 will have assigned, to channel 1, priority values of 7.5, 5, 7.5 and 9 for beams 1 to 4 respectively. Similarly, channel 2 will have priority values of 7.5, 6, 7.5 and 6 for beams 1 to 4 respectively. Channel 3 will have priority values of 7.5, 3, 9.5 and 8 for beams 1 to 4 respectively.

Thus, at block 196 of the channel assignment routine, the processor 68 will calculate a maximum priority difference or $MPD_C$ value of +1.5 for channel 1, 0.0 for channel 2, and +2.0 for channel 3.

As the $MPD_C$ value of 0.0 corresponding to channel 2 is the lowest relative priority value (least $MPD_C$ value), the processor will be directed at block 198 to assign channel 2 to beam 1. A cursory inspection of the traffic demand and priority values shows that this choice is advantageous, as channel 1 is more greatly needed by beam 4, which is currently using 80% of its clear channels, and channel 3 is more greatly needed for beam 3, which is currently using 90%, or all but one, of its clear channels.

Beam Hand-off Routine

Figure 10:
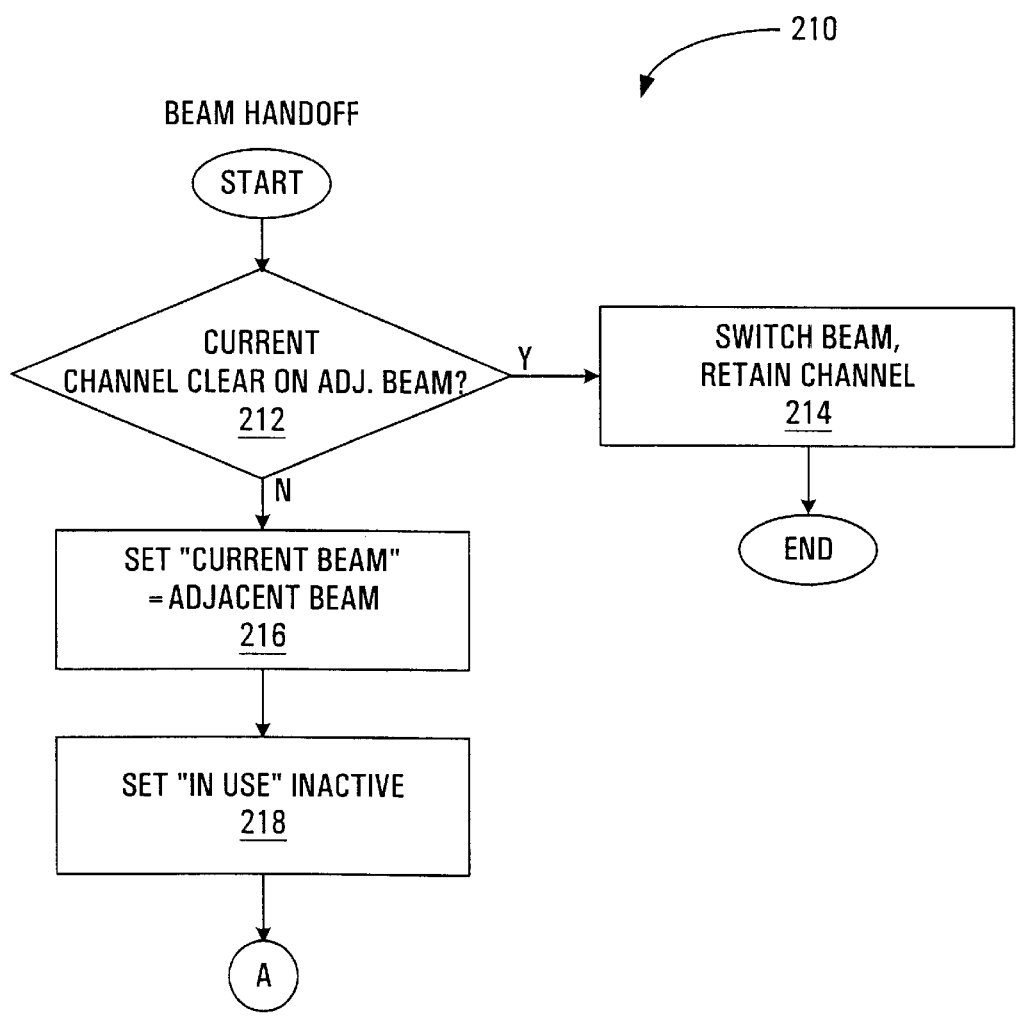
FIG. 10 is a flow chart of a beam hand-off routine executed by the frequency channel assignment device of the control unit shown in FIG. 2.

As shown in FIG. 10, the beam hand-off routine is designated generally by the reference character 210. In this embodiment, the beam hand-off routine includes instruction codes stored in the program memory 70 shown in FIG. 2.

Generally, the beam hand-off routine 210 directs the processor 68 to communicate with a source moving from a first region to a second region, by first directing the processor to receive an indication of channel quality representing a channel quality in the second region, of a frequency channel used in the first region to communicate with the source. The processor is then directed to hand-off the frequency channel to a transceiver in the second region, to cause the transceiver in the second region to use the frequency channel to communicate with the source in the second region, in response to the indication representing at least a predetermined minimum channel quality.

More particularly, as the mobile telephone switching office (MTSO), which is monitoring movement of mobile stations such as cellular telephones within the cell 22, indicates that a mobile station is moving from one beam to an adjacent beam within the cell, the MTSO signals the base station 30 to transfer or "hand-off" the call to an adjacent beam within the cell. Conventionally, this would be achieved by simply transferring the call to a different channel on the adjacent beam. Although such a hand-off is intended to be performed sufficiently quickly that it is not noticeable to a user, it will be appreciated that in many instances there is a brief mute or signal interruption as the mobile station re-tunes to the new channel. To address this difficulty, the present embodiment of the invention first determines whether it is possible to simply maintain the same channel and switch the channel onto the adjacent beam, rather than switching frequency channels.

Referring to FIGS. 2, 3 and 10, the beam hand-off routine 210 is initiated upon receiving a signal from the MTSO directing the base station 30 to switch a call from one beam onto an adjacent beam within the cell 22. Such signalling from the MTSO is conventional and need not be described in further detail.

The beam hand-off routine 210 begins with a first block of codes 212 shown in FIG. 10, which directs the processor 68 to receive an indication of channel quality representing a channel quality in the second region, of a frequency channel used in the first region to communicate with a source, and to determine whether the indication represents at least a pre-determined minimum channel quality. This is achieved by first directing the processor to examine the channel record 101 in the priority table 100 corresponding to the channel upon which the call to be handed off is presently being conducted. More particularly, block 212 directs the processor to read the contents of the channel quality field 108 of the current channel record corresponding to the adjacent beam to which the call is to be transferred, to determine whether the channel quality of the current channel is sufficiently high for the call to be continued on the same channel within the adjacent beam. For example, the processor may be directed to determine whether the channel quality value for the adjacent beam is greater than or equal to four, representing a minimum acceptable quality. Alternatively, other minimum quality values may be substituted, depending on performance requirements and network administrator preferences.

If the indication of channel quality represents at least a pre-determined minimum channel quality on the adjacent beam to permit the call to continue to be conducted on same channel therein, block 214 directs the processor 68 to hand-off the frequency channel to a transceiver in the second region to cause the transceiver in the second region to use the frequency channel to communicate with the source in the second region. More particularly, block 214 directs the processor to control the transceiver chain 40 to switch the beam rather than switching the frequency channels. In other words, the call is simply transferred, on the same frequency channel, from the original beam to the adjacent beam. As the call remains on the same frequency, the mobile station does not have to re-tune to a new frequency, and accordingly, no mute or signal interruption will occur. The beam hand-off routine is then ended.

If at block 212 the channel quality for the currently used channel on the adjacent beam is not sufficiently high to continue to conduct the call on the same frequency channel in the adjacent beam, block 216 directs the processor 68 to set an identification of the "current beam" stored in the memory 80 shown in FIG. 2 equal to an identification of the adjacent beam onto which the call is to be transferred. Block 218 directs the processor to reset the contents of the channel-in-use field 106 of the channel record 101 corresponding to the current channel to inactive to indicate that the current channel will now be available within the cell and that channel quality may be measured for the channel. The processor is then directed back to block 182 of the channel assignment routine 180 shown in FIG. 8. The identification of the adjacent beam produced at block 216 effectively directs the processor to treat the adjacent beam as a beam requesting a channel, and to execute the channel assignment routine 180 to assign a frequency channel to the adjacent beam in response to channel quality and priority values, as previously described.

Cell Hand-off/end Call

Although the beam hand-off routine 210 shown in FIG. 10 has been described for execution when a user moves from one beam to an adjacent beam within a cell, it will be appreciated that the principles of this embodiment of the invention may be equally applied when a communication source moves between other types of regions. For example, when a source moves from one cell to an adjacent cell, the present embodiment may be combined with existing channel-borrowing techniques known in the art, to intelligently decide whether or not to hand-off the same frequency channel from the current cell to the adjacent cell.

In the absence of such an intelligent cell-to-cell handoff, referring back to FIG. 3, it will be appreciated that a hand-off of a call to an adjacent cell may otherwise be conducted in an essentially conventional manner, with the exception that the processor 68 is directed to set inactive the contents of the channel-in-use field 106 of the channel record 101 corresponding to the channel which is currently being used for the call which is about to be handed off to the adjacent cell.

Similarly, when a call is ended, the processor 68 is directed to set inactive the contents of the corresponding channel-in-use field 106.

While specific embodiments of the invention have been described and illustrated, such embodiments should be considered illustrative of the invention only and not as limiting the invention as construed in accordance with the accompanying claims.

What is claimed is:

1. A method of assigning frequency channels to a beam in a multi-beam cellular communications system, the method comprising:

a) generating a set of priority values for the multi-beam cellular communication system, each of said priority values representing selection priority for a corresponding frequency channel for a particular beam; and b) assigning a frequency channel to a given beam in response to said set of priority values.

2. The method claimed in claim 1 further comprising producing a channel quality value for each frequency channel, for each beam.

3. The method claimed in claim 2 further comprising updating said channel quality value.

4. The method claimed in claim 2 wherein assigning further comprises assigning to a given beam a frequency channel having the highest channel quality value for said given beam, and where two or more frequency channels have approximately the same channel quality value for said given beam, assigning to said given beam a frequency channel having a lowest relative priority value of said channels among a group of beams.

5. The method claimed in claim 4 further comprising sorting a plurality of records corresponding to respective frequency channels according to channel quality values for a given beam.

6. The method claimed in claim 5 wherein assigning comprises assigning to said given beam a frequency channel associated with a record preceding remaining records in a descending sort.

7. The method claimed in claim 1 wherein generating comprises generating said priority values in response to channel quality and traffic pattern.

8. The method claimed in claim 7 further comprising receiving an indication of channel quality from a channel quality measurement device.

9. The method claimed in claim 8 further comprising generating a value representing traffic pattern.

10. The method claimed in claim 9 wherein generating a value representing traffic pattern comprises producing a measurement of traffic demand on a beam.

11. The method claimed in claim 10 wherein producing a measurement of traffic demand comprises measuring frequency channel usage.

12. The method claimed in claim 11 wherein producing a measurement of traffic demand comprises producing a measure of channel blocking experienced on said beam.

13. The method claimed in claim 10 wherein generating a said set of priority values comprises producing said priority values as a function of channel quality and traffic demand.

14. A computer readable medium for providing codes for directing a processor in a multi-beam cellular communications system, to assign frequency channels to a beam by:
 a) generating a set of priority values for the multi-beam cellular communications system, each of said priority values representing selection priority for a corresponding frequency channel for a particular beam; and
 b) assigning a frequency channel to a given beam in response to said set of priority values.

15. A computer data signal embodied in a carrier wave, said data signal comprising code segments for directing a processor in a multi-beam cellular communications system, to assign frequency channels to a beam, said code segments comprising:
 a) a first code segment for directing said processor to generate a set of priority values for the multi-beam cellular communications system, each of said priority values representing selection priority for a corresponding frequency channel for a particular beam; and
 b) a second code segment for directing said processor to assign a frequency channel to a given beam in response to said set of priority values.

16. An apparatus for assigning frequency channels to a beam in a multi-beam cellular communications system, the apparatus comprising:
 a) means for generating a set of priority values for the multi-beam cellular communications system, each of said priority values representing selection priority for a corresponding frequency channel for a particular beam; and
 b) means for assigning a frequency channel to a given beam in response to said set of priority values.

17. An apparatus for assigning frequency channels to a beam in a multi-beam cellular communications system, the apparatus comprising:
 a) a priority value generator operable to generate a set of priority values for the multi-beam cellular communications system, each of said priority values representing selection priority for a corresponding frequency channel for a particular beam; and
 b) a frequency channel assignment device operable to assign a frequency channel to a given beam in response to said set of priority values.

18. The apparatus claimed in claim 17 further comprising a channel quality value generator for producing a channel quality value for each frequency channel, for each beam.

19. The apparatus claimed in claim 18 wherein said channel quality value generator produces a succession of channel quality values.

20. The apparatus claimed in claim 18 wherein said frequency channel assignment device assigns to a given beam a frequency channel having the highest channel quality value for said given beam and where two or more frequency channels have approximately the same channel quality value for said given beam, assigns to said given beam a frequency channel having a lowest relative priority value of said channels among a group of beams.

21. The apparatus claimed in claim 20 further comprising a sorter for sorting a plurality of records corresponding to respective frequency channels according to channel quality values for a given beam.

22. The apparatus claimed in claim 21 wherein said sorter comprises a processor circuit.

23. The apparatus claimed in claim 21 wherein said assignment device assigns to said given beam a frequency channel associated with a record preceding remaining records in a descending sort produced by said sorter.

24. The apparatus claimed in claim 17 wherein said priority value generator generates said priority values in response to channel quality and traffic pattern.

25. The apparatus claimed in claim 24 further comprising a receiver for receiving an indication of channel quality from a channel quality measurement device.

26. The apparatus claimed in claim 25 further comprising a traffic pattern value generator for generating a value representing traffic pattern.

27. The apparatus claimed in claim 26 wherein said traffic pattern value generator is operable to produce a measurement of traffic demand on a beam.

28. The apparatus claimed in claim 27 wherein said traffic pattern generator is operable to measure frequency channel usage.

29. The apparatus claimed in claim 28 wherein said traffic pattern generator is operable to produce a measure of channel blocking experienced on said beam.

30. The apparatus claimed in claim 27 wherein said priority value generator generates said priority values as a function of channel quality and traffic demand.

* * * * *